United States Patent [19]
Adams et al.

[11] Patent Number: 6,016,374
[45] Date of Patent: Jan. 18, 2000

[54] OPTICAL FIBER COMMUNICATIONS SYSTEM WITH ADAPTIVE DATA EQUALIZER

[75] Inventors: Laura Ellen Adams, Basking Ridge; Young-Kai Chen, Berkeley Heights, both of N.J.; Gerald Nykolak, Long Island, N.Y.

[73] Assignee: Lucent Technologies Inc., Murray Hill, N.J.

[21] Appl. No.: 08/963,893

[22] Filed: Nov. 4, 1997

[51] Int. Cl.[7] .............................. G02B 6/28; H04B 10/00; H03H 7/30

[52] U.S. Cl. ............................ 385/24; 385/3; 385/39; 385/42; 385/48; 359/154; 375/11; 375/14

[58] Field of Search ................................. 385/1, 2, 3, 14, 385/16, 24, 32, 39, 42, 48; 359/154; 375/11, 14

[56] References Cited

U.S. PATENT DOCUMENTS

| | | | |
|---|---|---|---|
| 5,446,809 | 8/1995 | Fritz et al. ................................. | 385/17 |
| 5,517,213 | 5/1996 | Bhatt et al. ............................... | 375/232 |
| 5,572,611 | 11/1996 | Jinguji et al. ............................. | 385/17 |
| 5,828,700 | 10/1998 | Korn ......................................... | 375/11 |
| 5,844,941 | 12/1998 | Mack et al. .............................. | 375/232 |
| 5,880,645 | 3/1999 | Everitt et al. ............................. | 333/18 |

Primary Examiner—Brian Healy
Attorney, Agent, or Firm—Mathews, Collins, Shepherd & Gould, P.A.

[57] ABSTRACT

In accordance with the present invention, an optical fiber communications system is provided with an adaptive data equalizer to correct for linear disortion of signals transmitted over optical fibers. A feedback signal from a receiver is used to custom tailor the spectral profile of a launched pulse to thereby minimize the distortion of a received pulse. The system uses optical taps for feedback control in order to adapt to changing conditions in the fiber path.

6 Claims, 1 Drawing Sheet

OPTICAL FIBER COMMUNICATIONS SYSTEM WITH ADAPTIVE DATA EQUALIZER

FIELD OF THE INVENTION

The present invention relates to optical fiber communications systems and, in particular, to an optical fiber communications system including an adaptive data equalizer.

BACKGROUND OF THE INVENTION

In optical fiber communications systems, an optical fiber simultaneously carries many different communications channels. In the use of such a system, channels are frequently added or removed at various points—typically called nodes—in the network. For example, channels are added for long distance transmission and removed at their destination. Or if one or more paths are lost or overloaded, channels must be removed from the lost or overloaded path and added to another. An optical communications system for performing these functions is described, for example, in U.S. patent application Ser. No. 08/668,196 entitled, "Optical Fiber Transmission System With an Active Optical Router for Multiplexing" filed by Miriam deBarros et al. on Jun. 21, 1996, now U.S. Pat. No. 5,721,796 which is incorporated herein by reference.

A common problem in virtually all such optical fiber communications systems is that optical signals encounter a wide variety of different paths between receiver and transmitter, including different types of fiber and components. Different circuit paths will be established to connect a given transmitter with different receivers. Different types of fiber and components may be encountered on each path. In the absence of compensation, a signal will be degraded due to chromatic dispersion. This linear distortion mechanism becomes more severe as the bit rate is increased. Accordingly there is a need for an optical fiber communications system with a data equalizer capable of adapting to changing conditions and changing optical paths.

SUMMARY OF THE INVENTION

In accordance with the invention, an optical fiber communications system is provided with an adaptive data equalizer to correct for linear distortion of signals transmitted over optical fibers. In particular, a feedback signal from a receiver is used to custom tailor the spectral profile of a launched pulse and thereby to minimize the distortion of the received pulse. Because the system uses feedback control, it will adapt for changing conditions in the fiber path. Conveniently, the adaptation process is incurred during the training (sounding) session of a data frame when a train of pulses are sent through the network and looped back. After the training is completed, the loop-back path is disconnected, and data transmission begins with the transmitted pulses pre-distorted to adapt to the connected network.

BRIEF DESCRIPTION OF THE DRAWINGS

The advantages, nature and various additional features of the invention will appear more fully upon consideration of the illustrative embodiments now to be described in detail in connection with the accompanying drawing.

Figure 1:
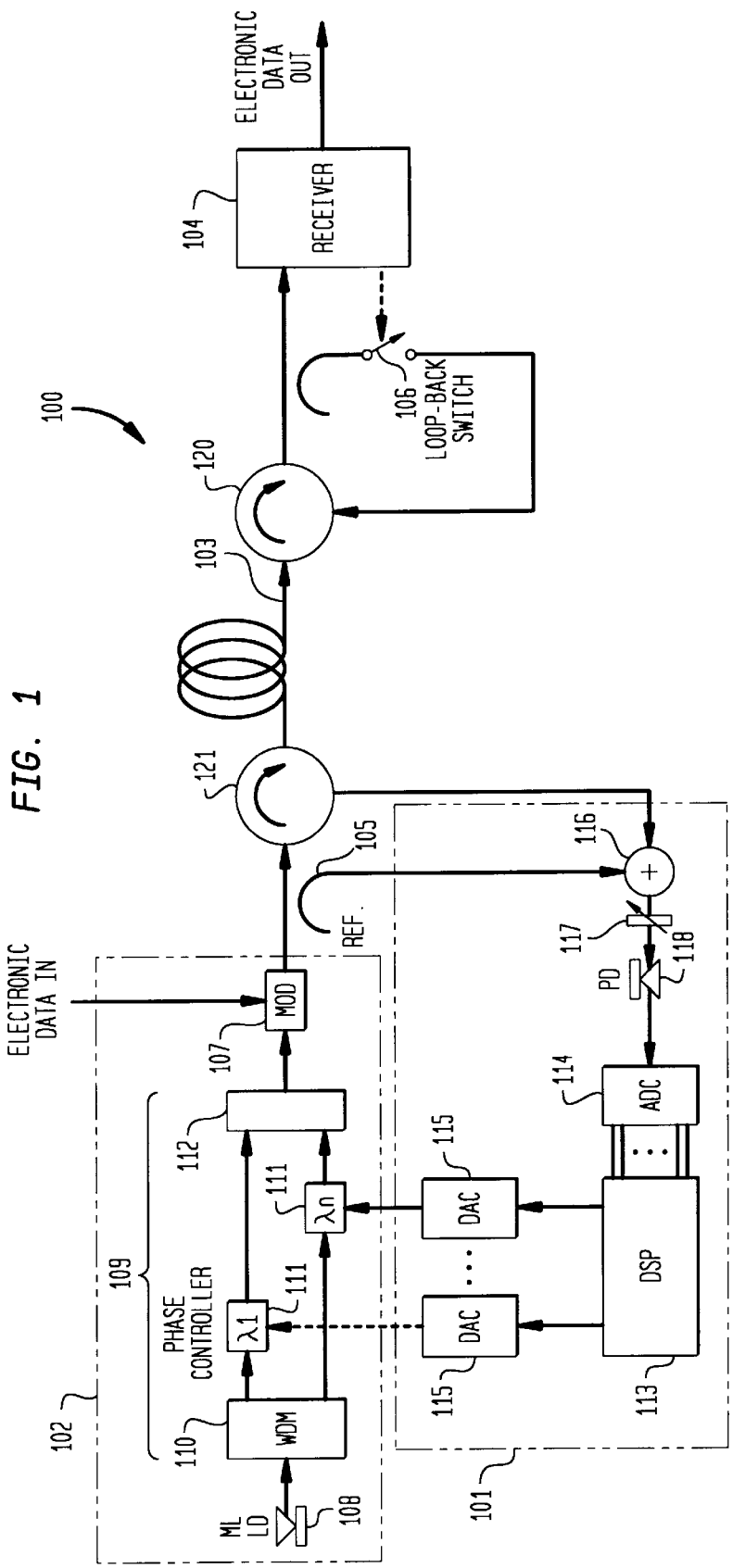
FIG. 1 is a schematic illustration of an optical fiber communications system including an adaptive data equalizer.

It is to be understood that this drawing is for purposes of illustrating the concepts of the invention and is not to scale.

DETAILED DESCRIPTION

Referring to the drawing, FIG. 1 is a schematic illustration of an optical communication system 100 provided with an adaptive equalizer 101. In essence, the system comprises a transmitter 102 of adaptively equalized pulses, a transmission fiber 103 and a receiver 104. A portion of the pulse stream leaving the transmitter is tapped off fiber 103 by tap 105 as a reference signal, and a portion of the transmitted pulse stream at the receiver is tapped off, as by switchable tap 106 and looped back via circulators 120, 121 to the adaptive equalizer 101. The equalizer, in response to the reference signal and the looped back signal, adjusts the phases of spectral components of the transmitted pulses to reduce linear distortion.

Typically the transmitter comprises a modulator 107 and source 108 of short optical pulses such as a mode-locked or gain-switched laser. In addition the transmitter includes an arrangement 109 for permitting separate phase control of a plurality of spectral components of the pulses from source 108. In the arrangement illustrated, the pulses are separated into a plurality of spectral components by a first wavelength division multiplexer (WDM) 110. The spectral components $\lambda_i$ presented on respective arms of the WDM are passed through separate respective phase controllers 111, and then recombined in a second WDM 112 before entering the modulator 107. The phase controllers 111 can be individually controlled by the adaptive equalizer 101 to reduce linear distortion.

The adaptive equalizer can comprise a digital signal processor 113, with appropriate analog-to-digital and digital-to-analog converters 114, 115 respectively, for receiving and processing signals representative of the tapped reference and loop back pulses. In a typical arrangement, a combiner 116 receives and combines the reference signal and the loop back signal. A tunable wavelength selective element 117 sequentially selects spectral components of the combined signal, and a photodetector 118 responds to the selected components.

The following describes preferred operation of the system. At the outset of operation, knowledge of the amplitude and phase relationship between the various spectral components of the reference pulse is useful. Hence, the pulse source 107 is first characterized, prior to system operation, to determine the spectral profile of its pulses. Initially, the phase controllers 111 will be adjusted to apply a known, equal phase delay to each spectral component. The modulator 108, used for encoding binary data, may be driven so as to not introduce any additional chirp on the optical pulses. Hence, the spectral profile of the original reference pulses at start up will be a replica of the pulses at the source output, adjusted by a constant phase delay.

The reference pulses, tapped off at the input to the system, are be compared with the looped back pulses to characterize the dispersion of the link. After the optical combiner is a wavelength selective element 117, such as a scanning Fabry-Perot interferometer or a grating, which will select one spectral component at a time from the combined pulse streams to homodyne on the photodetector 118. The two pulse streams are synchronized in time and their relative polarization states are equalized. The output signal from the photodetector is digitized using analog-to-digital converter 114 and analyzed using digital signal processor 113. From traditional homodyne theory, the phase difference between the selected spectral component of the reference and looped-back pulse may be determined. This measured phase difference will be twice the phase difference between this spectral component of the reference pulse and the pulse at the receiver. This factor of 2 arises because the looped-back pulse traverses the link twice.

We are interested in the phase which each spectral component accumulates in traversing the link once from input to receiver. The relative phase difference for each spectral component is measured in a sequential fashion by tuning the wavelength selective element. In this manner, the dispersion of the transmission path is determined. If the link contains only fiber (e.g. no filters or other dispersive elements), then it may only be necessary to measure the first few spectral components to extract the link dispersion. The phase differences for the remaining spectral components can then be calculated. All of the relative phase information is analyzed and stored using digital signal processing technology. Once the spectral profiles of the initial reference pulses and receiver pulses are known, the necessary phase adjustments may be determined to optimally pre-distort the pulses at the input to the system.

Dispersion is detrimental when it causes pulses to broaden in time, as the result of different spectral components traveling at different speeds. When the temporal pulse duration is increased and pulses begin to overlap in time, this intersymbol interference acts to degrade system performance (e.g. received BER). Hence, it is desirable to have a minimum temporal pulse duration at the receiver, a condition which results when the pulse is not chirped. By making all of the spectral components of the pulse at the receiver have the same phase, it is possible to satisfy this unchirped condition. This task may be achieved by applying the following algorithm. First, the phase of each spectral component of the pulse at the receiver is determined. This is done, for each spectral component, by summing the phase of the reference at the input and the phase accumulated in traversing the link from input to receiver. The phase accumulated by each spectral component of the pulse in traversing the link is fixed. Hence, the phases of the spectral components at the input must be altered such that the phases of all spectral components match at the receiver. After propagation, the initial phases of the pulse spectral components at the receiver are compared, and the largest phase value is stored. For the spectral component which initially has the maximum phase value at the receiver, no phase adjustment will be made. For each of the remaining spectral components, error signals are generated by the DSP to satisfy the summation condition, and fed, via a respective plurality of digital-to-analog converters 115, to the phase controllers 111. In this manner, the spectral components of the transmitted pulses are individually feedback controlled. This pre-distortion compensation is generally not realized on the timescale of a single pulse but rather uses many pulses. Hence, it is not necessary for the ADC or DACs to operate at the high data rate.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

What is claimed:

1. An optical fiber communications system comprising:

an optical transmitter for transmitting adaptively equalized optical pulses, said transmitter comprising a source of optical pulses, a plurality of phase controllers for separately controlling the phases of a plurality of spectral components of said pulses, and a modulator for said pulses;

an optical transmission fiber for transmitting optical pulses from said transmitter;

an optical receiver for receiving optical pulses from said fiber;

an optical tap for tapping an optical reference signal indicative of said pulses near said transmitter;

an optical tap for tapping an optical loop back signal indicative of said pulses near said receiver; and an adaptive equalizer responsive to said optical reference signal and said optical loop back signal for controlling said phase controllers to reduce linear distortion in the received pulses.

2. A communications system according to claim 1 wherein said transmitter includes a first wavelength division multiplexer for receiving pulses from said source and presenting a plurality of spectral components of said pulses on a plurality of paths, said phase controllers disposed on respective paths, and a second wavelength division multiplexer for recombining said spectral components for presentation to said modulator.

3. A communications system according to claim 1 wherein said adaptive equalizer comprises a digital signal processor for processing signals representative of said reference signal and said loop back signal to generate control signals for said phase controllers.

4. A communications system according to claim 2 wherein said adaptive equalizer comprises an optical combiner for combining said reference signal and said loop-back signal.

5. A communications system according to claim 4 further comprising a wavelength selective element for receiving the output of said combiner and permitting selection of spectral components of said signal.

6. A communications system according to claim 5 further comprising a photodiode for receiving the output of said wavelength selective element and presenting a signal representative of a selective spectral component to said digital signal processor.

* * * * *